No. 673,324. Patented Apr. 30, 1901.
A. C. OUTLAND.
LOGGING CART.
(Application filed Sept. 11, 1900.)
(No Model.)
2 Sheets—Sheet 1.

Witnesses
Fenton S. Felt,
James R. Mansfield

Inventor
Alonzo C. Outland.
By Alexander Bowell
Attorney

No. 673,324. Patented Apr. 30, 1901.
A. C. OUTLAND.
LOGGING CART.
(Application filed Sept. 11, 1900.)

(No Model.) 2 Sheets—Sheet 2.

Witnesses
Fenton S. Belt,
James R. Mansfield

Inventor
Alonzo C. Outland.

By Alexander McDowell
Attorney

UNITED STATES PATENT OFFICE.

ALONZO C. OUTLAND, OF BARNESVILLE, OHIO.

LOGGING-CART.

SPECIFICATION forming part of Letters Patent No. 673,324, dated April 30, 1901.

Application filed September 11, 1900. Serial No. 29,655. (No model.)

*To all whom it may concern:*

Be it known that I, ALONZO C. OUTLAND, of Barnesville, in the county of Belmont and State of Ohio, have invented certain new and useful Improvements in Logging-Carts; and I hereby declare that the following is a full, clear, and exact description thereof, reference being had to the accompanying drawings, which form part of this specification.

This invention is an improvement in logging-carts especially adapted to facilitate the transportation of sawed logs and other heavy timbers or objects, being adapted to uphold one end of the log and enable the same to be more easily dragged from place to place.

The invention consists in the novel construction of the cart, whereby it can be readily attached to the log and whereby the draft or pulling strain will lift the end of the log to which the cart is hitched, and when once lifted to proper position the parts may be locked to uphold the log until it is desired to drop the same, when the parts can be released and the log dropped, thus facilitating the handling and transportation of the logs.

The invention consists in the combinations summarized in the claims, and in the following description reference is had to the drawings accompanying, from which the construction of the cart will be easily comprehended.

Figure 1:
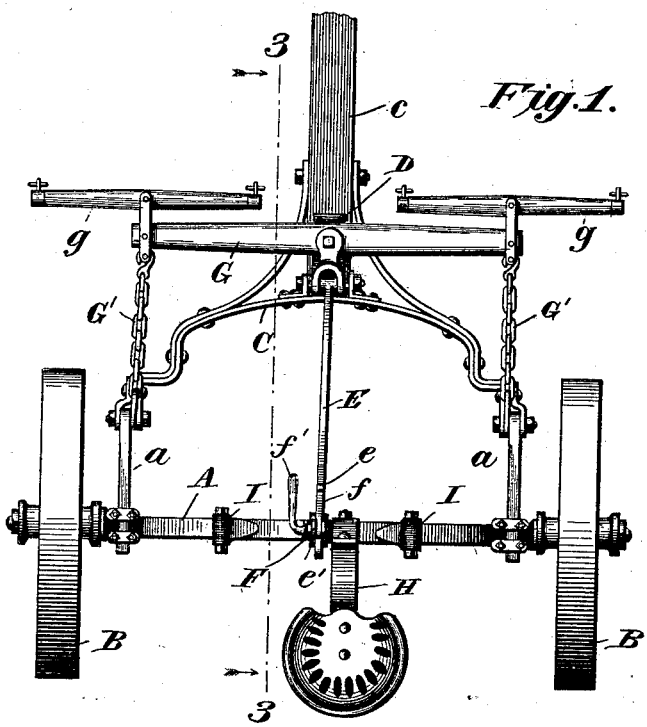
Figure 2:
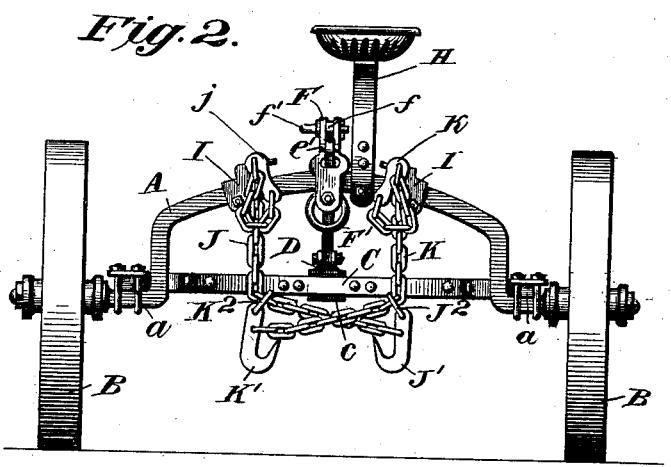
Figure 3:
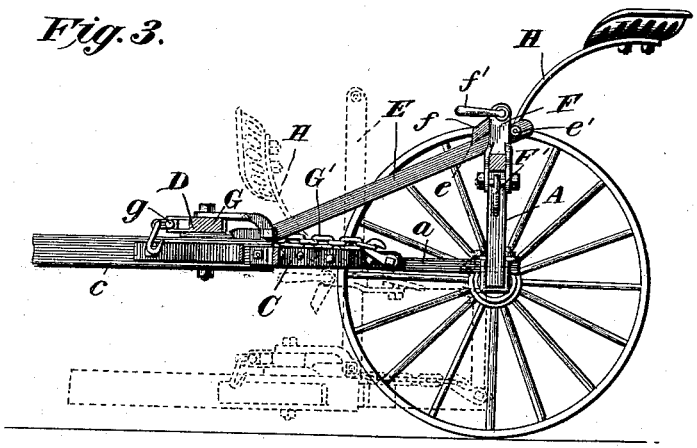
Figure 4:
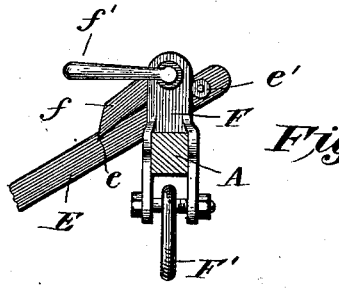
Figure 5:
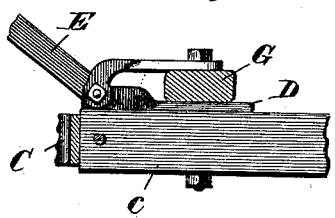

In said drawings, Figure 1 is a plan view of the cart. Fig. 2 is a rear elevation thereof. Fig. 3 is a section on line 3 3, Fig. 1, showing the cart in its transporting condition in full lines and its position for attachment to or disengagement from a log in dotted lines. Figs. 4 and 5 are details.

The cart comprises a stout arched axle A, which is supported by wheels B B. To the axle, next the wheels, are rigidly secured arms $a$, which, as shown, are shorter in length than the spokes of the wheel. These arms extend parallel, and to their outer or free ends are pivotally connected the ends of the tongue-bow C, which is preferably curved, corresponding to the arch of the axle. This bow may be composed of double strap-irons, if desired, and is rigidly secured to the tongue $c$ in any suitable manner, as indicated in the drawings. To the base of the tongue $c$ is attached a casting or metallic plate D, to which is pivoted one end of a bar E, which extends over the axle A and projects through a slotted casting F, attached to the axle, and in this casting F is pivoted a pawl $f$, provided with a handle $f'$, by which it can be operated. When the axle is in a vertical position, the pawl $f$ engages a notch $e$ in the upper end of the bar E and locks the parts in the position shown in full lines, Fig. 3, and the axle is prevented from falling backward by a pin $e'$ in the upper end of bar E, which will engage against the casting F.

A doubletree G may be attached to the tongue $c$, as shown, and is provided with the usual singletrees $g$, and the ends of the doubletree may be loosely shackled by chains G' to the arms $a$, as indicated in the drawings. A seat-support H may also be clamped to the axle for the accommodation of the driver. At each side of the casting F chain-anchors I are clamped to the axle, and to these anchors may be connected the drag-chains J and K, which are provided with ordinary hooks $j$ $k$ on one end, and on their other ends are large clamping-hooks J' and K'. The shank of hook J' is provided with a ring $J^2$, by which it is loosely hung on chain K, while the shank of hook K' is provided with a ring $K^2$, by which it is loosely hung on chain J. By this means a flexible but powerful chain clamp is provided, by which logs may be easily and powerfully grasped. The casting F may also be provided with a depending ring F', from which the hooks may be conveniently suspended during transportation.

In using the cart for transporting a log, for example, it is backed up to the end of the log and then dog $f'$ is released, permitting the axle A to fall over onto the tongue-bow C, the parts then being in suitable position to attach or release a log, as indicated in dotted lines, Fig. 3. This enables the anchors and chains to be brought close to the log, and the attendant can secure the clamp-hooks K' and J' to the log and take up the slack of the chains very close to the axle while the parts are in this position. The driver can then start the team forward and at the same time can use the seat H as a lever to bring the axle back to a vertical position until the pawl $f$ drops into the notch $e$ of bar E. In doing this the end of the log or body to which the cart has been chained will be lifted above the ground, and it can then be very readily transported. When it is desired to drop the log, the pawl f is thrown out of engagement with bar E and the axle will drop forward on the tongue-bow, as before, thus slacking up the chains and enabling the hooks to be very readily detached.

The purpose of the arms a, which are secured to the axle and tongue-bow, is to raise the axle and log. To do this, the arms a must be as long or longer (the longer the easier to raise) than the arch or bow of axle. If the arms were shorter than arch or bow of axle, the team could not raise the log without some additional agency. The axle is thrown down in loading position, and after being made fast to the log the team is started and the log raises with the axle, and as the axle turns up to loading position the pawl f engages the notch e in the upper end of the bar E, as before explained, and the team need not be stopped after once starting.

The essential features of the cart will be obvious from the foregoing, and of course minor details of its construction can be varied within the scope of the invention.

Having thus described my invention, what I claim as new, and desire to secure by Letters Patent, is—

1. The combination of the wheeled axle, the tongue-bow pivotally connected thereto and the bar pivoted to one part and adapted to be locked to the other part, to hold them apart, for the purpose and substantially as described.

2. The combination of the arched wheel-axle, the tongue-bow pivotally connected to the axle near its outer extremities, means for locking the bow and axle in transporting position, and means for suspending a log or other object from said axle.

3. The combination of the wheeled axle, arms projecting therefrom near opposite ends thereof, the tongue-bow pivotally connected to the outer extremities of these arms, means for locking the bow and axle in transporting position and means for suspending a log or other object from said axle.

4. In a logging-cart, the combination of the axle, the arms projecting from the axle near the ends thereof, the tongue-bow pivotally connected to the outer extremities of said arms, the bar pivotally connected to said tongue-bow, and means for locking said axle to said bar, substantially as described.

5. The combination of the arched axle, the wheels at the ends thereof, the parallel arms projecting from the axle near the ends thereof, the tongue-bow pivotally connected to the outer extremities of said arms, the bar pivotally connected to said tongue-bow, a slotted casting on the axle through which the free end of said bar passes, and means for locking said axle and said bar, substantially as described.

6. In a logging-cart, the combination of the arched wheeled axle, parallel arms projecting from the axle near the ends thereof, a tongue pivotally connected to the outer extremities of said arms, and a bar pivotally connected to said tongue-bow, and means for locking said axle and said bar; with the chain-anchors attached to said axle, the opposite chains, and hooks attached to said chains, each provided with a ring through which the opposite chain passes, all substantially as described.

7. In a logging-cart, the combination of the arched axle, the wheels at the ends thereof, the parallel arms projecting from the axle near the ends thereof, the tongue pivotally connected to the outer extremities of said arms and the bar pivotally connected to said tongue-bow, a slotted casting on the axle through which the free end of said bar passes, and means for locking said axle and said bar; with the chain-anchors attached to said axle, the chains, and hooks, all substantially as described.

In testimony that I claim the foregoing as my own I affix my signature in presence of two witnesses.

ALONZO C. OUTLAND.

Witnesses:
ALBERT MALDEN,
C. HOWARD.